US008558425B2

(12) United States Patent
Stahlhut et al.

(10) Patent No.: US 8,558,425 B2
(45) Date of Patent: Oct. 15, 2013

(54) MOTOR HAVING STATOR WITH GENERALLY PLANAR WINDINGS

(75) Inventors: Ronnie Dean Stahlhut, Bettendorf, IA (US); Jim Milton Shoemaker, Horicon, WI (US)

(73) Assignee: Deere & Company, Moline, IL (US)

( * ) Notice: Subject to any disclaimer, the term of this patent is extended or adjusted under 35 U.S.C. 154(b) by 1023 days.

(21) Appl. No.: 11/700,676

(22) Filed: Jan. 31, 2007

(65) Prior Publication Data
US 2008/0100174 A1    May 1, 2008

Related U.S. Application Data

(60) Provisional application No. 60/854,823, filed on Oct. 26, 2006.

(51) Int. Cl.
H02K 9/20    (2006.01)

(52) U.S. Cl.
USPC ...................... 310/156.37; 310/268

(58) Field of Classification Search
USPC ............... 310/156.32–37, 268, 266, 267, 54, 310/254.1, 112–114
See application file for complete search history.

(56) References Cited

U.S. PATENT DOCUMENTS

| | | | | |
|---|---|---|---|---|
| 112,233 A * | 2/1871 | Fagan | ......................... | 126/99 R |
| 2,920,574 A * | 1/1960 | Sampietro | .................. | 417/423.3 |
| 3,189,770 A * | 6/1965 | Henry-Baudot | ......... | 310/156.37 |
| 3,296,475 A * | 1/1967 | Parker | ........................... | 310/268 |
| 3,709,835 A * | 1/1973 | Forster | .......................... | 252/513 |
| 4,307,309 A * | 12/1981 | Barrett | .......................... | 310/166 |
| 4,340,833 A * | 7/1982 | Sudo et al. | .................... | 310/268 |
| 4,413,895 A * | 11/1983 | Lee | ................................... | 396/464 |
| 4,503,368 A * | 3/1985 | Sakamoto | ................... | 310/49 R |
| 4,594,524 A * | 6/1986 | Sudo | ........................... | 310/68 R |
| 4,658,162 A * | 4/1987 | Koyama et al. | ............. | 310/68 R |
| 4,658,332 A * | 4/1987 | Baker et al. | .................... | 361/751 |
| 4,733,115 A * | 3/1988 | Barone et al. | ................... | 310/68 R |
| 5,252,881 A * | 10/1993 | Muller et al. | ................. | 310/309 |
| 5,294,853 A * | 3/1994 | Schluter et al. | ............. | 310/68 R |
| 5,334,898 A * | 8/1994 | Skybyk | ......................... | 310/268 |
| 5,334,899 A * | 8/1994 | Skybyk | ......................... | 310/268 |
| 5,646,465 A | 7/1997 | Paweletz | | |
| 5,710,476 A * | 1/1998 | Ampela | ........................ | 310/268 |
| 5,783,893 A * | 7/1998 | Dade et al. | .................... | 310/266 |
| 5,982,074 A * | 11/1999 | Smith et al. | ................... | 310/261 |
| 6,011,337 A * | 1/2000 | Lin et al. | .................. | 310/156.37 |
| 6,181,048 B1 * | 1/2001 | Smith et al. | .................... | 310/261 |
| 6,304,011 B1 * | 10/2001 | Pullen et al. | .................... | 310/52 |

(Continued)

FOREIGN PATENT DOCUMENTS

EP    353042 A1 *    1/1990
WO    WO 01/47089    6/2001

*Primary Examiner* — Tran Nguyen
*Assistant Examiner* — Naishadh Desai
(74) *Attorney, Agent, or Firm* — Yee & Associates, P.C.

(57) ABSTRACT

An electric motor features liquid cooling capability. A rotor and a secondary rotor are coupled to a shaft for rotation therewith. The rotor comprises a first annular member and magnets secured to the first annular member. The secondary rotor comprises a second annular member and secondary magnets secured to the second annular member. A stator is spaced axially apart from the rotor and the secondary rotor. The stator comprises a plurality of generally planar windings secured to a magnetic core and a secondary planar windings secured to a secondary magnetic core. The magnetic core has at least one cooling channel.

15 Claims, 5 Drawing Sheets

(56) References Cited

U.S. PATENT DOCUMENTS

| | | |
|---|---|---|
| 6,663,362 B1 | 12/2003 | Lentz et al. |
| 6,707,208 B2 * | 3/2004 | Durham et al. .......... 310/156.37 |
| 6,741,010 B2 * | 5/2004 | Wilkin ........................... 310/268 |
| 6,794,791 B2 * | 9/2004 | Ahmed et al. ................. 310/268 |
| 7,109,625 B1 * | 9/2006 | Jore et al. ....................... 310/198 |
| 2002/0171324 A1 | 11/2002 | Smith et al. |
| 2003/0007442 A1 | 1/2003 | Henrichs |
| 2003/0062780 A1 | 4/2003 | Kaneko et al. |
| 2004/0135465 A1 * | 7/2004 | Smith et al. .................... 310/268 |
| 2005/0088052 A1 * | 4/2005 | Ionel et al. ................. 310/156.09 |
| 2006/0202584 A1 * | 9/2006 | Jore et al. ....................... 310/179 |

\* cited by examiner

MOTOR HAVING STATOR WITH GENERALLY PLANAR WINDINGS

This document (including the drawings) claims priority based on U.S. provisional Ser. No. 60/854,823, filed Oct. 26, 2006, and entitled MOTOR HAVING A STATOR WITH GENERALLY PLANAR WINDINGS, under 35 U.S.C. 119(e).

FIELD OF THE INVENTION

This invention relates to a motor having a stator with generally planar windings.

BACKGROUND OF THE INVENTION

A motor may have a stator winding that is associated with a printed circuit board. Although such a motor may be axially compact, the printed circuit board does not provide a convenient medium for liquid cooling of the motor to achieve compliance with high density performance requirements. For example, a multilayer circuit board with cooling channels for a liquid coolant may be too expensive or lack the reliability of more traditional motor configurations in which windings are wound from wire. Thus, there is a need for an axially compact motor that supports liquid cooling or to achieve compliance with high density performance requirements.

SUMMARY OF THE INVENTION

In accordance with one aspect of the invention, an electric motor features liquid cooling capability. A rotor and a secondary rotor are coupled to a shaft for rotation therewith. The rotor comprises a first annular member and magnets secured to the first annular member. The secondary rotor comprises a second annular member and secondary magnets secured to the second annular member. A stator is spaced axially apart from the rotor and the secondary rotor. The stator comprises a plurality of generally planar windings secured to a magnetic core and a secondary planar windings secured to a secondary magnetic core. The magnetic core has at least one cooling channel.

DESCRIPTION OF THE PREFERRED EMBODIMENT

Figure 1:
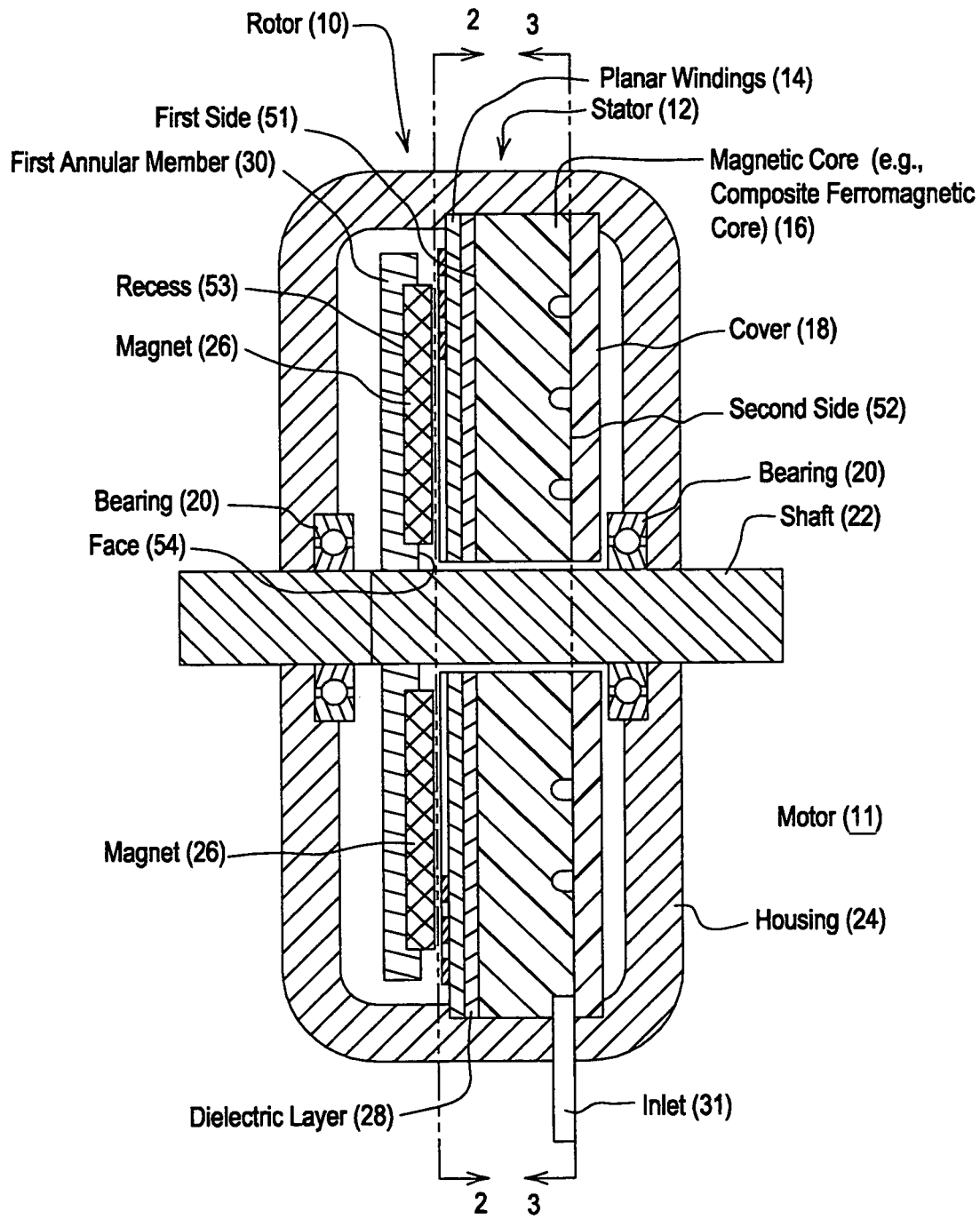
FIG. 1 is a cross-sectional view of an electric motor in accordance with a first embodiment.

FIG. 1 illustrates a cross-section of a motor 11 that supports liquid cooling. In FIG. 1, a rotor 10 is coupled to a shaft 22 for rotation therewith. The rotor 10 comprises a first annular member 30 and magnets 26 secured (e.g., adhesively bonded) to the first annular member 30. A stator 12 is spaced axially apart from the rotor 10. The stator 12 comprises one or more generally planar windings 14 secured (e.g., adhesively bonded) to a first side 51 of a magnetic core 16. A cover 18 is secured to a second side 52 of the magnetic core 16. The second side 52 is opposite the first side 51. The magnetic core 16 has at least one cooling channel (e.g., 308 in FIG. 3) in the second side 52 of the magnetic core 16. The cooling channel is adapted to receive a liquid coolant.

With respect to the rotor 10, the first annular member 30 comprises an iron or ferrous core. As shown in FIG. 1, the first annular member 30 has a recess 53 in one face for receiving the magnets 26, although in other configurations the recess 53 may be omitted. The magnets 26 may be adhesively bonded to the first annular member 30, press-fitted into the recesses, fastened to the first annular member 30, or otherwise secured to the first annular member 30. In one embodiment, the magnets 26 are arranged in a ring, a generally annular shape, or otherwise positioned about the face 54 of the first annular member 30. The first annular member 30 provides a fixed flux path for the magnetic field of the magnets 26.

With respect to the stator 12, the generally planar windings 14 comprise a metal traces or patterns on a dielectric substrate, such as printed circuit board. In one embodiment, the planar windings 14 are composed of at least one of copper and nickel-copper alloy. The planar windings 14 may be formed by a series of electrically conductive traces (e.g., curved or rectilinear traces) that are spaced apart from each other. The conductive traces may be formed of a metal or alloy and may be organized in rows. Although virtually any suitable ratio of stator poles (of the stator 12) to rotor poles (of the rotor 10) may be used in the motor 11, in one illustrative embodiment, the ratio of stator poles to rotor poles is approximately 3:2.

The magnetic core 16 is affixed to the planar windings 14 via dielectric layer 28. The dielectric layer 28 may be composed of a thermally conductive adhesive, a polymeric adhesive, a plastic adhesive, or another adhesive. For example, the dielectric layer 28 may comprise a high isolation dielectric to provide an electrically insulating barrier between the magnetic core 16 and the planar windings 14. The cooling channel 308 is routed through the magnetic core 16 to provide a cooling jacket or path (e.g., a circuitous or winding path) for the circulation of coolant. In one example, the cooling jacket or cooling channel 308 may be generally spiral. In another example, the cooling channel 308 may be arranged as a series of generally parallel rows.

The cooling jacket or cooling channel 308 terminates in an inlet 31 and an outlet 32. The inlet 31 is capable of receiving a pressurized or gravity fed coolant fluid and an outlet 32 is capable of discharging a coolant fluid. In one arrangement for a gravity fed configuration, the inlet 31 may be positioned on a top of the magnetic core 16, whereas the outlet 32 is positioned on a bottom of the magnetic core 16.

In one embodiment, the magnetic core 16 comprises a composite ferromagnetic core 16. The magnetic core 16 is composed of powdered magnetic material and a matrix. For example, the powdered magnetic material is distributed within a polymeric matrix or plastic matrix. The powdered magnetic material may comprise a rare earth magnet, a samarium cobalt magnet, an neodymium iron boron magnet, an iron magnet, an iron alloy magnet, or a ferromagnetic material.

The magnetic core 16 supports a magnetic flux path through the stator 12 for the electromagnets formed by energizing the planar windings 14. The magnetic core 16 may store energy in a magnetic field in proportion to the electrical energy that energizes the planar windings 14. The magnetic field in the magnetic core 16 is subject to losses from hysteresis and eddy currents, for example. However, the powdered magnetic material tends to limit eddy current losses for a varying flux field such that hysteresis losses tend to predominate over eddy current losses. The polymeric matrix and plastic matrix may comprise a fluoroplastic, fluoropolymer, or another dielectric material that is thermally stable or heat resistant for the operational temperature range of the motor 11.

In an alternate embodiment, the magnetic core 16 may comprise a ceramic or ferrite material.

Dielectric layer 28 is located between the planar windings 14 and the magnetic core 16. The dielectric layer 28 adhesively bonds the planar windings 14 to the magnetic core 16. In one embodiment, the dielectric layer 28 comprises a thermally conductive dielectric.

The motor 11 has a plurality of bearings 20. A housing 24 or casing supports the shaft 22 via the bearings 20. In one embodiment, the bearings 20 comprise radial bearings. As shown in FIG. 1, the bearings 20 may function as both radial and axial bearings 20. One bearing 20 may absorb axial thrust if the cover 18 contacts an annular bearing 20 surface within an interior of the housing 24. The other bearing 20 may absorb axial thrust if the first annular member 30 contacts an annular bearing 20 surface within an interior of the housing 24. In FIG. 1, the electric motor 11 features a generally planar stator 12 which is well suited for an axially compact design.

Figure 2:
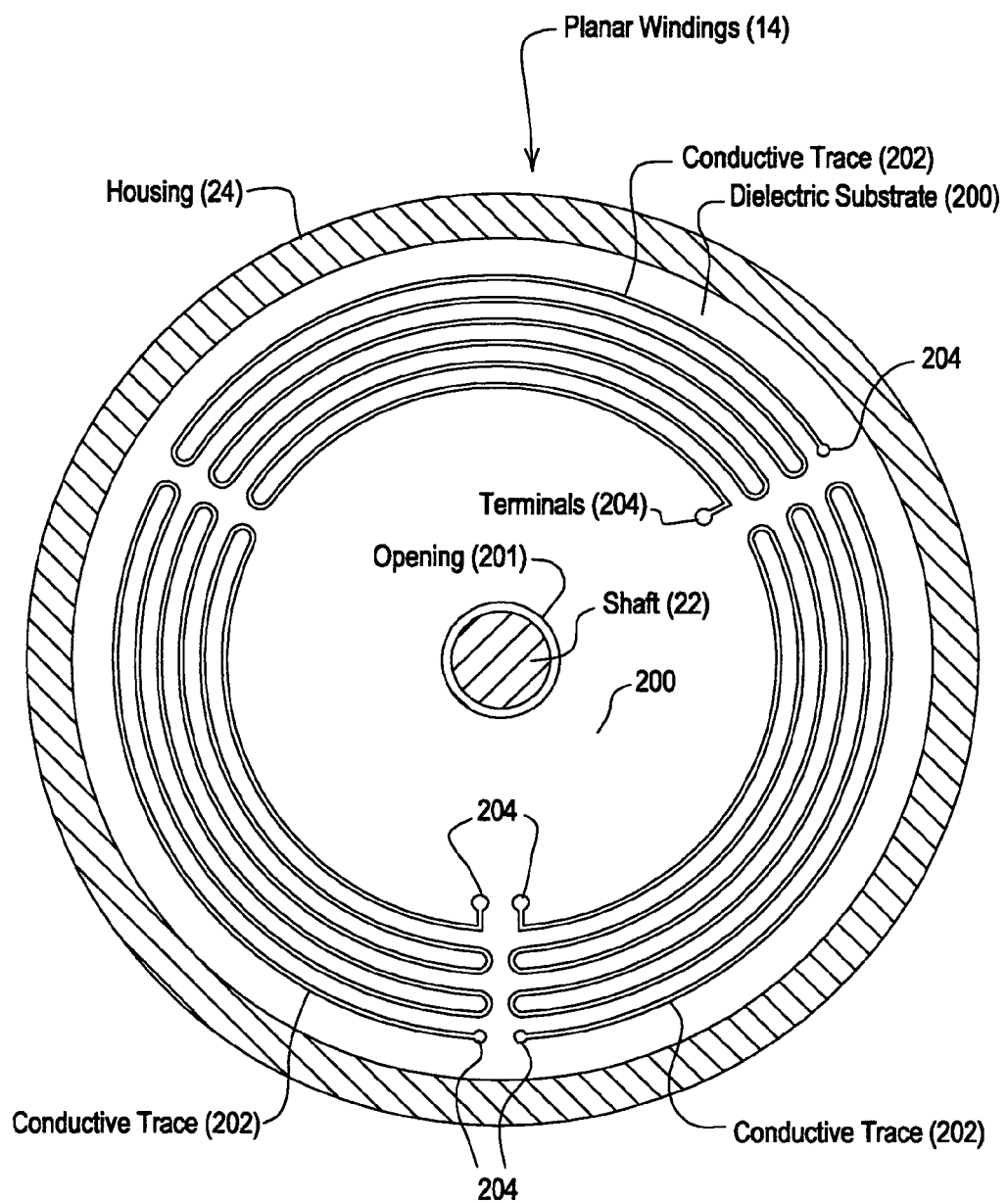
FIG. 2 shows the generally planar windings of the electric motor as viewed along reference line 2-2 of FIG. 1.

FIG. 2 provides one possible illustrative embodiment of a group of generally planar windings 14. As shown, each generally planar winding comprises a series of electrically conductive traces 202 (e.g., curved metallic traces) that terminates in pads or other terminals 204. Each of the planar windings 14 may comprises a series of rows of electrically conductive traces on a corresponding area of a dielectric substrate 200 (e.g., a ceramic, fiberglass, plastic, or polymeric substrate). The generally planar winding may have virtually any geometric shape that can be formed on (e.g., by photo-imaging, chemical etching, electroless deposition, or otherwise) a dielectric substrate 200, or portion thereof. In one embodiment, the dielectric substrate 200 or planar windings 14 comprise a printed circuit board. The dielectric substrate 200 or planar windings 14 have an opening for receiving the shaft 22. Although three generally planar windings 14 are shown in FIG. 2, virtually any number of planar windings 14 may be used.

Figure 3:
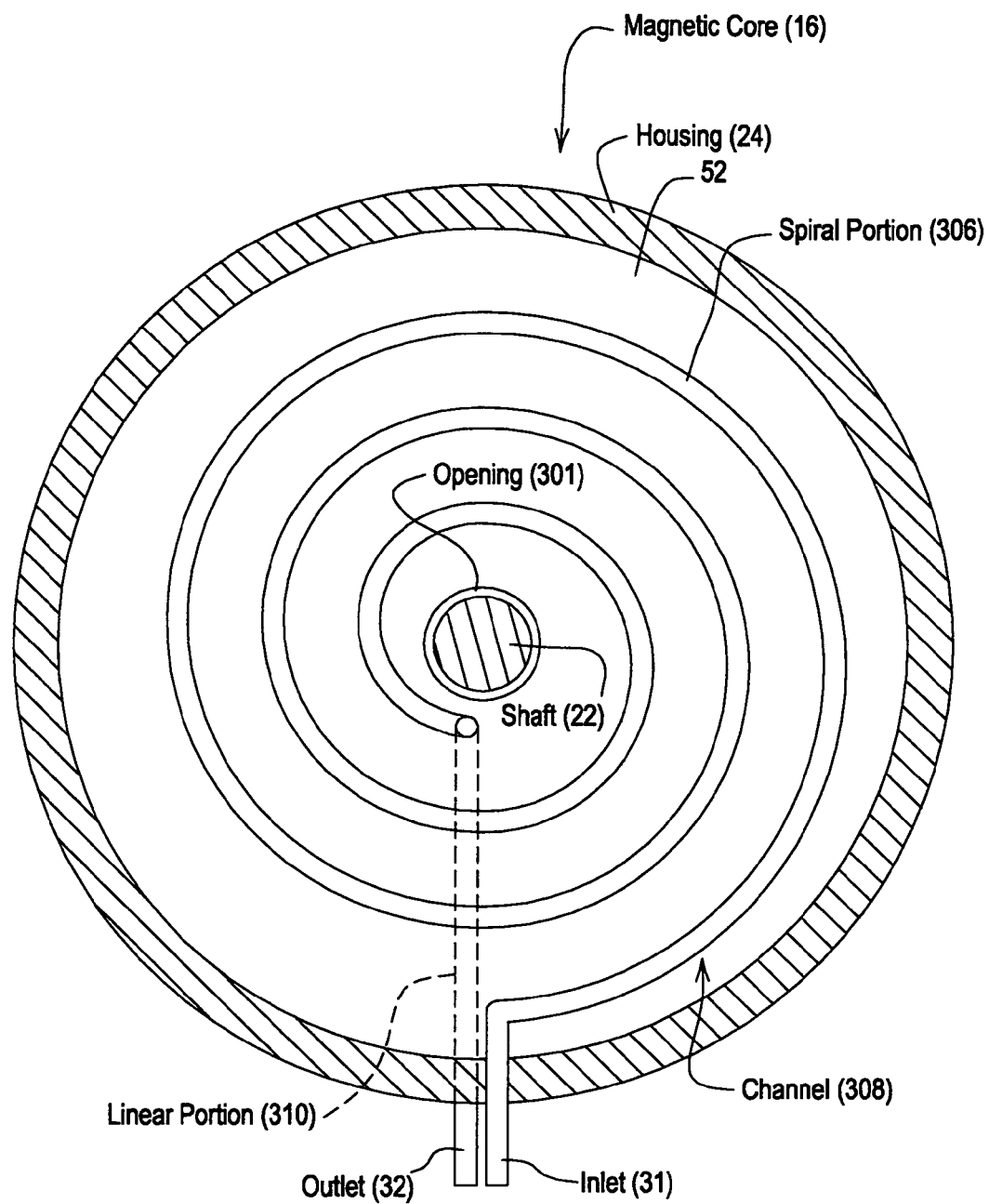
FIG. 3 shows the cooling channels of the electric motor as viewed along reference line 3-3 of FIG. 1.

FIG. 3 provides one possible illustrative embodiment of a the cooling jacket or cooling channel 308 in a second side 52 of the magnetic core 16. The cooling channel 308 may be covered with the cover 18. A gasket or sealant may be used between the second side 52 of the magnetic core 16 and the cover 18 to provide a hermetic seal or suitable coolant-resistant, leakproof (e.g., watertight) seal. As shown the cooling jacket or cooling channel 308 follows a generally spiral path, although virtually any continuous loop, curved path, or other path may be used. Here, a generally spiral portion 306 of the cooling channel 308 connects with a generally linear portion 310 of the cooling channel 308 near a central region of the magnetic core 16. The generally linear portion 310 as shown as dashed lines because it lies beneath the generally spiral portion 306. An opening 301 in the central region is of sufficient size and shape for the shaft 22 to pass through.

Figure 4:
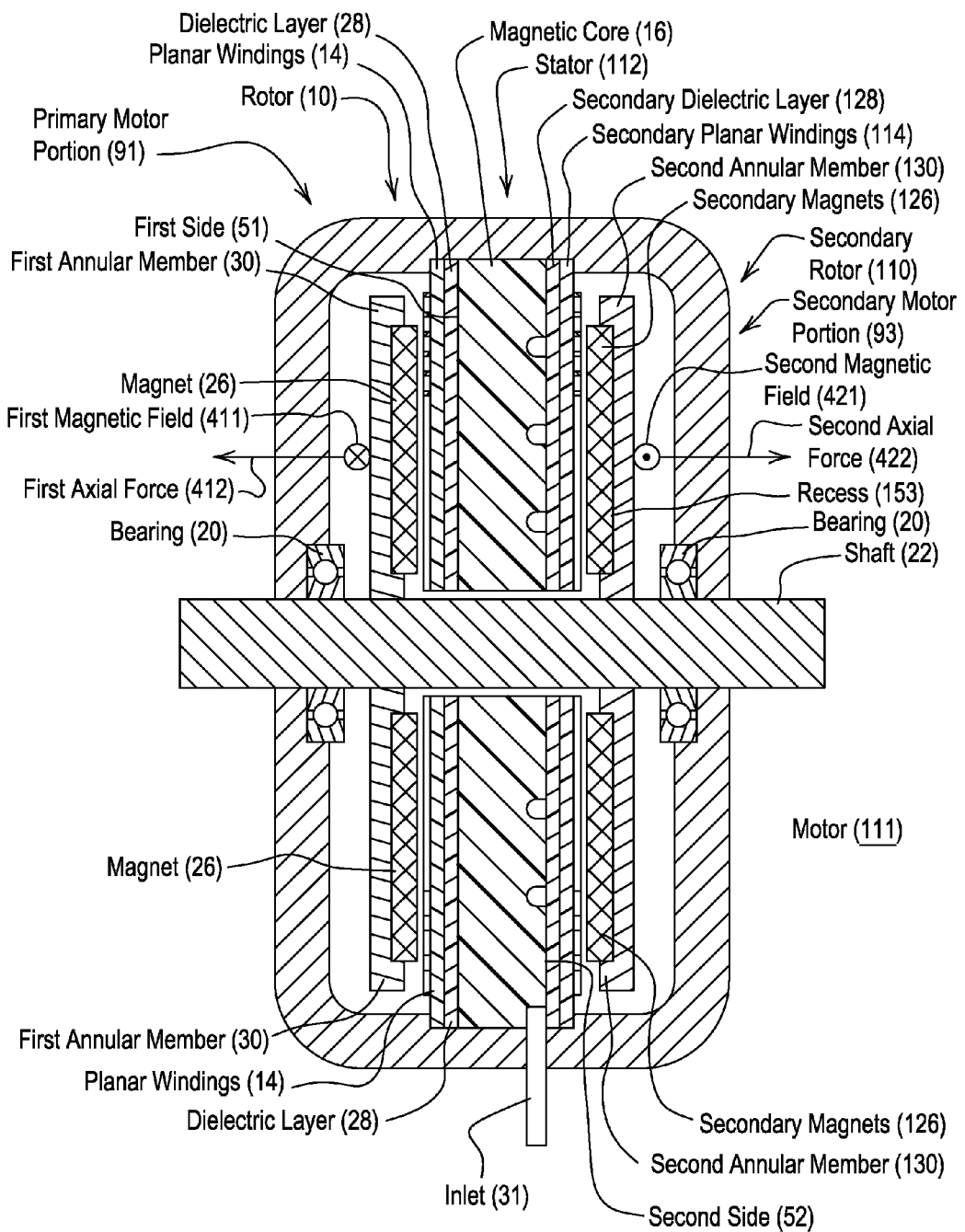
FIG. 4 is a cross-sectional view of an electric motor in accordance with a second embodiment.

The motor 111 of FIG. 4 is similar to the motor 11 of FIG. 1, except the motor 11 of FIG. 4 further comprises a secondary motor portion 93 to axially balance a primary motor portion 91 during operation of the motor 11. Like reference numbers in FIG. 1 and FIG. 4 indicate like elements.

The motor 111 of FIG. 4 comprises a stator 12 with a first set of generally planar windings 14 and a second set of generally planar windings. The second set of generally planar windings may be referred to as secondary planar windings 114 or secondary generally planar windings. A secondary rotor 110 is spaced apart axially from the secondary planar windings 114.

A stator 112 comprises the generally planar windings 14 and the secondary planar windings 114. In particular, the stator 12 comprises a plurality of generally planar windings 14 secured to a first side of a magnetic core 16 and secondary planar windings 114 secured to a second side of a magnetic core 16. The magnetic core 16 has at least one cooling channel 308 associated with the second side of the magnetic core 16. The stator 12 is spaced axially apart from the rotor 10 and the secondary rotor 10.

The secondary rotor 110 comprises secondary magnets 126 mounted on a second annular member 130. Although the second annular member 130 has recesses 153 for receiving the secondary magnets 126 as shown, in an alternate embodiment the recesses may be omitted. The secondary magnets 126 may be adhesively bonded to the second annular member 130, press-fitted into the recesses, attached with fasteners, or otherwise secured to the second annular member 130. The second annular member 130 may be composed of iron or a ferrous material.

The magnets 26 and the secondary magnets 126 are arranged in a first ring and a second ring, respectively. The first annular member 30 comprises a first iron or ferrous core for supporting the magnets 26. The second annular member 130 comprises a second iron or second ferrous core for supporting the secondary magnets 26.

The planar windings 14 comprise electrically conductive traces on a first dielectric substrate. The secondary planar windings 114 comprise electrically conductive traces on second dielectric substrate. In one embodiment, the planar windings 14 are composed of at least one of copper and nickel-copper alloy. Although virtually any suitable ratio of stator poles to rotor poles may be used in the motor 111, in one illustrative embodiment, the ratio of stator poles to rotor poles is approximately 3:2 with respect to the stator 112 and rotor 10, respectively, and with respect to the stator 112 and the secondary rotor 110, respectively.

The magnetic core 16 comprises a composite ferromagnetic core. In one embodiment, the magnetic core 16 is composed of powdered magnetic material and a polymer matrix. A first dielectric layer 28 is located between the planar windings 14 and the magnetic core 16 and a secondary dielectric layer 128 is located between secondary planar windings 114 and the magnetic core 16. In one configuration, the dielectric layer 28 and the secondary dielectric layer 128 each comprise a thermally conductive dielectric, a polymeric adhesive, a plastic adhesive, or another adhesive. For example, the secondary dielectric layer 128 may comprise a high isolation dielectric to provide an electrically insulating barrier between the magnetic core 16 and the secondary planar windings 114. The cooling channel 308 (in FIG. 3) in the magnetic core 16 is generally spiral or shaped along any other path that provides for circulation of coolant within the magnetic core 16.

In FIG. 4, the secondary motor portion 93 axially balances the primary motor portion 91 during operation of the motor 11. The primary motor portion 91 comprises the rotor 10 and the planar windings 14, while the secondary motor portion 93 comprises the secondary rotor 110 and the secondary planar windings 114. During operation of the motor 111, a first magnetic field 411 associated with the primary motor portion 91 induces or produces a first axial force 412. A second magnetic field 421 associated with the secondary motor portion 93 produces or induces a second axial force 422. The first axial force 412 generally opposes or cancels out the second axial force 422 (e.g., in magnitude and direction) to balance the axial thrust. Accordingly, thrust bearings 20 may be eliminated or reduced to handle a lesser axial thrust than otherwise would be required.

Figure 5:
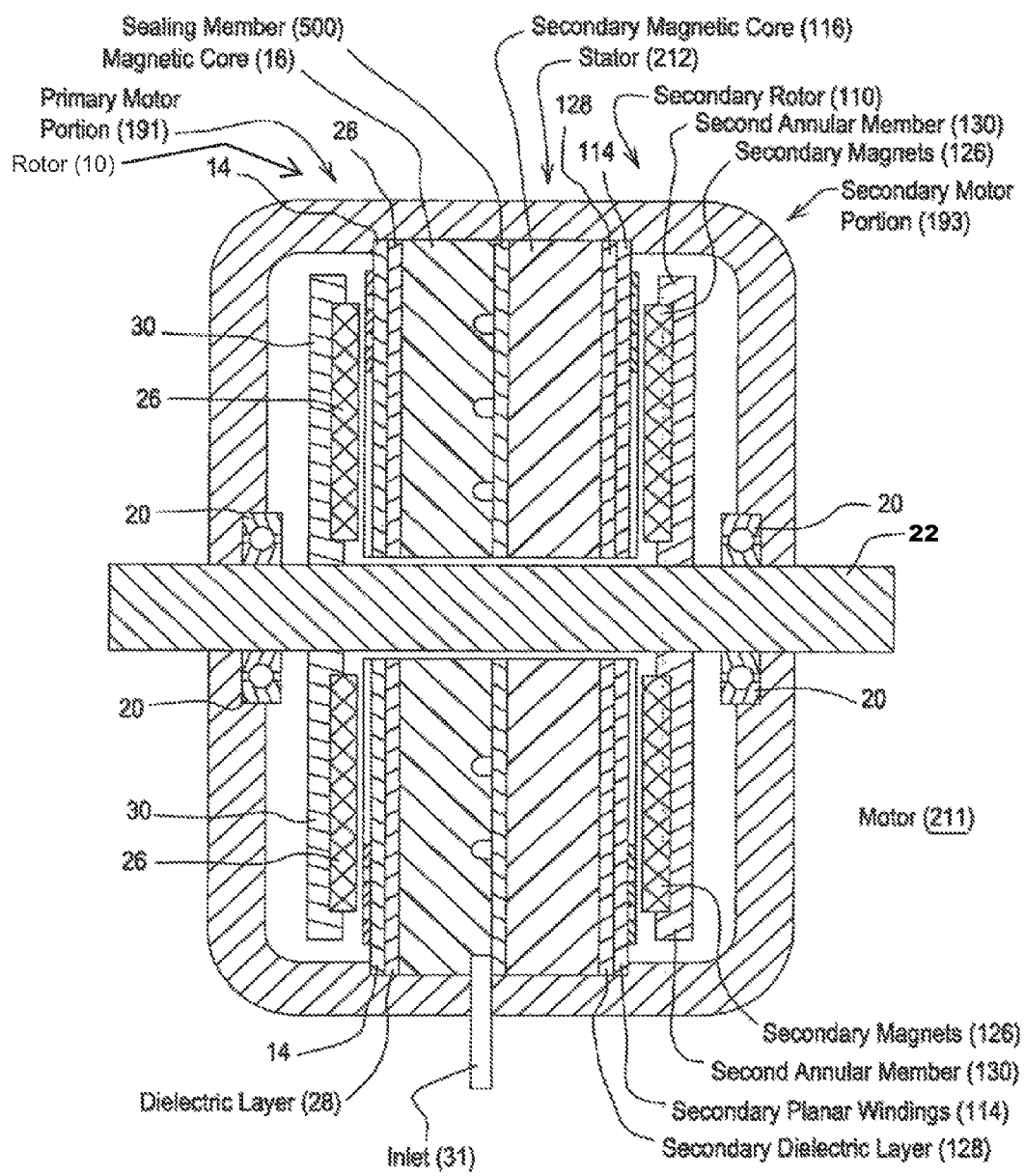
FIG. 5 is a cross-sectional view of an electric motor in accordance with a third embodiment.

The motor 211 of FIG. 5 is similar to the motor 11 of FIG. 1, except the motor 11 of FIG. 5 further comprises a secondary motor portion 193 to axially balance a primary motor portion 191 during the operation of the motor 211. Like reference numbers in FIG. 1, FIG. 4 and FIG. 5 indicate like elements.

The motor 211 of FIG. 5 uses a magnetic core 16 and a secondary magnetic core 116. The cores (16 and 116) may be separated by a sealing member 500 (e.g., a sealant, a gasket, an adhesive, an elastomer, a malleable metal gasket, or another device for providing a watertight or liquid-tight seal between the cores (16 and 116). The sealing member 500 may support the communication of fluid between one or more coolant channels 308 in the magnetic core 16 and one or more coolant channels in the secondary magnetic core 116. Accordingly, fluid that enters the inlet 31 of the magnetic core 16 may be circulated through the magnetic core 16 and the secondary magnetic core 116 prior to leaving the outlet 32. Although the outlet 32 is associated with the magnetic core 16, in an alternate embodiment the outlet 32 may be associated with the secondary magnetic core 116.

In FIG. 5, a rotor 10 is coupled to the shaft 22 for rotation therewith. The rotor 10 comprises a first annular member 30 and magnets 26 secured to the first annular member 30. A secondary rotor 110 is coupled to the shaft 22 for rotation therewith. The secondary rotor 110 comprises a second annular member 130 and secondary magnets 126 secured to the second annular member 130.

A stator 212 is spaced axially apart from the rotor 10 and the secondary rotor 110. The stator 212 comprises a plurality of generally planar windings 14 secured to a magnetic core 16 and secondary planar windings 114 secured to a secondary magnetic core 116. The magnetic core 16 and the secondary magnetic core 116 may be joined together or sealed together by a sealing member 500. The magnetic core 16 and the secondary magnetic core 116 have one or more cooling channels (e.g., a generally spiral cooling channel). The cooling channels terminate in an inlet 31 and an outlet 32.

The magnets 26 are arranged in a first ring and the secondary magnets 126 are arranged in a second ring. The first annular member 30 comprises a first iron or first ferrous core; the second annular member 130 comprises a second iron or second ferrous core.

The planar windings 14 comprise first conductive traces on a first dielectric substrate. The secondary planar windings 114 comprise secondary conductive traces on a secondary dielectric substrate. In one embodiment, the conductive traces are composed of at least one of copper and nickel-copper alloy. Although virtually any suitable ratio of stator poles to rotor poles may be used in the motor 211, in one illustrative embodiment, the ratio of stator poles to rotor poles is approximately 3:2 with respect to the stator 212 and rotor 10, respectively, and with respect to the stator 212 and the secondary rotor 110, respectively.

In one configuration, the planar windings 14 are formed on a first printed circuit board. The secondary planar windings 114 are formed on a second printed circuit board. The magnetic core 16 comprises a first composite ferromagnetic core; the secondary magnetic core 116 comprises a second composite ferromagnetic core. In one embodiment, the magnetic core 16 is composed of a powdered magnetic material and a polymer matrix; the secondary magnetic core 116 is composed of powdered magnetic material and a polymer matrix. Dielectric layer 28 is located between the planar windings 14 and the magnetic core 16. A secondary dielectric layer 128 is located between the secondary planar windings 114 and the secondary magnetic core 116. The dielectric layer 28 and the secondary dielectric layer 128 comprise a thermally conductive dielectric. For example, the secondary dielectric layer 128 may comprise a high isolation dielectric to provide an electrically insulating barrier between the secondary magnetic core 116 and the secondary planar windings 114.

In FIG. 5, the secondary motor portion 193 axially balances a primary motor portion 191 during operation of the motor 11. The primary motor portion 191 comprises the rotor 10 and the planar windings 14, while the secondary motor portion 193 comprises the secondary rotor 10 and the secondary planar windings 114. A first magnetic field 411 associated with the primary motor portion 191 may produce or induce a first axial force 412 on the rotor 10. A second magnetic field 421 associated with the secondary motor portion 193 may produce a second axial force 422 on the secondary rotor 10. The first axial force 412 generally opposes or cancels out the second axial force 422 to balance the axial thrust. Accordingly, thrust bearings may be eliminated or reduced in size to handle less load from those that are otherwise required.

Advantageously, in any embodiment of the motor disclosed herein, the planar windings (e.g., 14, 114) may be readily changed, revised, replaced, upgraded or updated. For example, the ratio of stator poles to rotor poles is readily changed to any desired ratio. Further, the resistance, reluctance or impedance characteristics of the planar windings are readily changed to accommodate different controllers or control configurations.

Having described the preferred embodiment, it will become apparent that various modifications can be made without departing from the scope of the invention as defined in the accompanying claims.

The following is claimed:

1. An electric motor comprising:
    a shaft,
    a rotor coupled to the shaft for rotation therewith, the rotor comprising a first annular member and magnets secured to the first annular member;
    a secondary rotor coupled to the shaft for rotation therewith, the secondary rotor comprising a second annular member and secondary magnets secured to the second annular member;
    a stator spaced axially apart from the rotor and the secondary rotor, the stator comprising a plurality of generally planar windings secured to a first outer side of a magnetic core and a secondary planar windings secured to a second opposite outer side of a secondary magnetic core, the magnetic core having at least one liquid cooling channel sealed at an inner side of the magnetic cores, wherein the at least one liquid cooling channel is spaced apart axially from the generally planar windings.

2. An electric motor comprising:
    a shaft,
    a rotor coupled to the shaft for rotation therewith, the rotor comprising a first annular member and magnets secured to the first annular member;
    a secondary rotor coupled to the shaft for rotation therewith, the secondary rotor comprising a second annular member and secondary magnets secured to the second annular member;
    a stator spaced axially apart from the rotor and the secondary rotor, the stator comprising a plurality of generally planar windings secured to a first outer side of a magnetic core and a secondary planar windings secured to a second opposite outer side of a secondary magnetic core, the magnetic core having at least one liquid cooling channel sealed at an inner side of the magnetic cores; and
a sealing member, between the magnetic core and the secondary magnetic core, that provides a liquid-tight seal between the magnetic core and the secondary magnetic core.

3. The electric motor according to claim 1 further comprising:
a first magnetic field between the magnets and the generally planar windings inducing a corresponding first axial force;
a second magnetic field between the secondary magnets and the secondary planar windings, the second magnetic field inducing a second axial force opposing the first axial force to balance the axial thrust associated with the motor.

4. The electric motor according to claim 1 wherein the magnets are arranged in a first ring, and wherein the secondary magnets are arranged in a second ring.

5. The electric motor according to claim 1 wherein the first annular member comprises a first iron or first ferrous core, and wherein the second annular member comprises a second iron or second ferrous core.

6. The electric motor according to claim 1 wherein the generally planar windings comprise first electrically conductive traces on a first dielectric substrate, and wherein the secondary planar windings comprise secondary electrically conductive traces on a secondary dielectric substrate.

7. The electric motor according to claim 6 wherein the electrically conductive traces are composed of at least one of copper and nickel-copper alloy.

8. The electric motor according to claim 1, wherein the generally planar windings comprise a first printed circuit board, and wherein the secondary planar windings comprise a second printed circuit board.

9. The electric motor according to claim 1 wherein the cooling channel is generally spiral.

10. The electric motor according to claim 1 wherein the magnetic core comprises a first composite magnetic core and wherein the secondary magnetic core comprises a second composite ferromagnetic core.

11. The electric motor according to claim 1 wherein the magnetic core is composed of a powdered magnetic material and a polymer matrix and wherein the secondary magnetic core is composed of powdered magnetic material and a polymer matrix.

12. The electric motor according to claim 1 further comprising
dielectric layer between the planar windings and the magnetic core, the dielectric layer comprising a thermally conductive dielectric; and
a secondary dielectric layer between the secondary planar windings and the secondary magnetic core, the secondary dielectric layer comprising a thermally conductive dielectric.

13. The electric motor according to claim 1, wherein the electric motor comprises a primary motor portion and a secondary motor portion, wherein the primary motor portion comprises the rotor and the generally planar windings and the secondary motor portion comprises the secondary rotor and secondary planar windings, and wherein the secondary motor portion is configured to axially balance the primary motor portion during operation of the electric motor.

14. The electric motor according to claim 1, wherein the inner side of the magnetic cores, the first outer side of the magnetic core and the second opposite outer side of the secondary magnetic core are substantially parallel to one another such that the at least one liquid cooling channel is substantially parallel to the generally planar windings and the secondary planar windings.

15. The electric motor according to claim 1, wherein the liquid cooling channel is spaced apart axially from the secondary planar windings.

* * * * *